(12) United States Patent
Eurich

(10) Patent No.: US 12,729,775 B2
(45) Date of Patent: Sep. 8, 2026

(54) MODULAR SYSTEM AND METHOD OF MANUFACTURING VALVES, ASSEMBLY, AND VALVE

(71) Applicant: Buerkert Werke Gmbh & Co. KG, Ingelfingen (DE)

(72) Inventor: Werner Eurich, Ingelfingen (DE)

(73) Assignee: Buerkert Werke Gmbh & Co. KG, Ingelfingen (DE)

( * ) Notice: Subject to any disclaimer, the term of this patent is extended or adjusted under 35 U.S.C. 154(b) by 120 days.

(21) Appl. No.: 18/931,256

(22) Filed: Oct. 30, 2024

(65) Prior Publication Data

US 2025/0137544 A1 May 1, 2025

(30) Foreign Application Priority Data

Oct. 31, 2023 (DE) ..................... 10 2023 130 149.7

(51) Int. Cl.
*F16K 31/12* (2006.01)
*F16K 27/02* (2006.01)
*F16K 31/122* (2006.01)

(52) U.S. Cl.
CPC .......... *F16K 27/02* (2013.01); *F16K 31/1221* (2013.01)

(58) Field of Classification Search
CPC ......... F16K 31/1221; F16K 27/02; F16K 1/52
See application file for complete search history.

(56) References Cited

U.S. PATENT DOCUMENTS 4,585,207 A * 4/1986 Shelton ............... F16K 31/1221 91/161
11,649,907 B2 5/2023 Eurich
2002/0027211 A1* 3/2002 Kajitani .............. F16K 31/1225 251/63.6
2005/0242312 A1* 11/2005 Kajitani .................... F16K 1/54 251/63.6
2008/0111095 A1* 5/2008 Naitoh .................... F16K 51/02 251/335.3
2017/0292626 A1* 10/2017 Zhang ................. F16J 15/3452
2021/0239222 A1* 8/2021 Sato .......................... F16K 7/16
2021/0239234 A1 8/2021 Eurich

FOREIGN PATENT DOCUMENTS

DE 2731890 A1 1/1979
DE 102020102652 A1 8/2021

* cited by examiner

*Primary Examiner* — Kelsey E Cary
(74) *Attorney, Agent, or Firm* — Dilworth IP, LLC

(57) ABSTRACT

A modular system having an assembly for manufacturing valves of two different valve types including a valve basic unit having a housing, an actuator base, and a piston/spindle unit with a piston displaceable in the housing. An end face of the piston and an end face of the actuator base define a pressure chamber. The actuator base and the housing delimit a dead space chamber on a side of the actuator base facing away from the piston. The actuator base includes at least one passage opening between the dead space chamber and the pressure chamber. Closure members for manufacturing a first valve type are each inserted into one of the passage openings to seal it in a gas-tight manner and to permanently disconnect the dead space chamber from the pressure chamber in terms of flow. For manufacturing a second valve type, the passage openings are left open.

11 Claims, 4 Drawing Sheets

26 38 50 48 52 56 29 38 27

MODULAR SYSTEM AND METHOD OF MANUFACTURING VALVES, ASSEMBLY, AND VALVE

TECHNICAL FIELD

The disclosure relates to a modular system and a method of manufacturing valves of different types, an assembly, and valves of different valve types.

BACKGROUND

The drive unit of a pneumatically driven process valve normally comprises a piston/spindle unit arranged in a housing, the piston being displaceably positioned in the housing. The spindle is connected at its free end to a valve element which cooperates with a valve seat to control a media flow through the valve. The piston defines a pressure chamber of variable volume, which is filled with compressed air to move the piston and the spindle via the piston. The spindle can move the valve element between a closed position, in which the valve element presses against the valve seat, and an open position, in which the valve element is lifted off the valve seat.

When the compressed air has been released from the pressure chamber, the pressure chamber has its smallest volume. This volume is referred to as dead volume since the air in this volume cannot be displaced by the movement of the piston. The dead volume of the pressure chamber has a strong influence on the opening movement of the piston since initially the smaller the dead volume, the greater the effect of the volume change in relation to the dead volume on the control pressure.

For shut-off valves, in which the valve element is only moved between the fully open position and the fully closed position, a dead volume that is as small as possible is of advantage here in order to achieve high dynamics, short switching times, and lower control air consumption.

For control valves, however, in which the valve element also assumes positions between the fully open position and the fully closed position, a larger dead volume allows more precise control of the media flow, since in the case of small media flows, the change in volume of the control chamber then does not have such a strong effect and better linearity is achieved.

Pneumatically driven process valves therefore require different drive units for different applications as shut-off valves or control valves. This leads to a high variety of parts, which has an adverse effect on manufacturing costs and storage costs.

It is the object of the disclosure to propose a valve having a dead volume that is easy to adapt in order to reduce the diversity of variants and thus to lower costs.

SUMMARY

The disclosure provides a modular system for the manufacture of valves of different types, which includes the following components:

- a valve basic unit which includes a pneumatic drive unit having a housing, an actuator base arranged within the housing, and a piston/spindle unit arranged within the housing, the piston/spindle unit including a piston displaceable in the housing, an end face of the piston and an end face of the actuator base opposite the end face of the piston defining a variable-volume pressure chamber in the interior of the housing, the actuator base and the housing delimiting a fixed-volume dead space chamber on a side of the actuator base facing away from the piston, and the actuator base having at least one passage opening between the dead space chamber and the pressure chamber; and
- a number of closure members which at least corresponds to the number of passage openings in the actuator base, the closure members being designed to be each inserted into one of the passage openings and to seal said passage opening in a gas-tight manner in order to fluidically selectively permanently disconnect the dead space chamber from the pressure chamber or permanently connect it to the pressure chamber.

During assembly of the valve, the dead volume of the valve is fixed by the insertion or omission of the at least one closure member, depending on the intended purpose of the valve. The valve basic unit is identical for both variants, so that the necessary variety of parts can be significantly reduced.

In this way, when using identical valve basic units, two different valve types can be realized, in which the dead volume is optimized for a shut-off valve or, respectively, for a control valve.

For use as a shut-off valve, the passage openings are sealed in order to produce as small a dead volume of the pressure chamber as possible.

Since all of the passage openings leading to the dead space chamber have to be sealed in a gas-tight manner for uncoupling the dead space chamber from the pressure chamber, at least one respective closure member is of course always inserted into each of these passage openings.

For use as a control valve, by contrast, the passage openings are left open in order to provide as large a dead volume of the pressure chamber as possible.

It is theoretically conceivable to provide a plurality of dead space chambers between the actuator base and the housing in order to design the dead volume to be variable in several steps. In this case, each of the dead space chambers would have one or more passage openings that are adapted to be sealed in a gas-tight manner using closure members. Depending on the desired application of the valve, none, one or several of the dead space chambers are then sealed with closure members in order to provide the desired dead volume of the pressure chamber. In the following, however, always only the case involving one single dead space chamber that includes one or more passage openings is considered in order to avoid an unnecessarily complex presentation. It is, however, possible for all of the options described and it is also part of the disclosure to subdivide the dead space chamber below the actuator base into a plurality of separate chambers, which can then be selectively added to the dead volume, so to speak, by leaving their passage openings open or closing them.

To simplify assembly and storage, all of the passage openings can be designed to be identical, so that only one single type of closure member needs to be used.

For example, the closure member is a ball made of a suitable material, such as, e.g., stainless steel, which has a larger diameter than the passage opening. The diameter of the ball can only slightly be larger than the diameter of the passage opening. In this way, the closure member can be simply pressed into the respective passage opening to seal the latter in a gas-tight manner. It is also conceivable to alternatively or additionally glue and/or weld the closure member in the passage opening.

In the inserted condition, however, the closure member should, if possible, not protrude beyond the end face of the actuator base into the pressure chamber. To this end, it is possible to form a step or shoulder on the inner surface of the passage opening, against which the closure member rests.

In a possible variant, the actuator base is provided with stabilizing ribs on a side facing away from the pressure chamber. Optionally, the supporting ribs may rest against the housing. For one thing, such stabilizing ribs allow the stability of the actuator base to be increased. For another thing, such stabilizing ribs could also be made use of to produce a plurality of dead space chambers between them, which are then radially neighboring and could be used to make the dead volume variable in several steps, as already described above.

As a rule, the actuator base includes a central opening, through which the spindle of the piston/spindle unit passes. The dead volume chamber should not be in fluid communication with this opening.

The dead space chamber should, of course, be completely sealed off from the housing and the pressure chamber away from the passage opening(s) so that it forms a dead volume. For example, for this purpose, the actuator base is permanently sealed in a gas-tight manner against an inner surface of the housing at a circumferential edge. Sealing is effected, for example, by welding, gluing and/or inserting a seal.

The above-mentioned object is also achieved by means of an assembly made up of a valve basic unit as described above, which includes a pneumatic drive unit having a housing, an actuator base arranged within the housing, and a piston/spindle unit arranged within the housing, the piston/spindle unit including a piston displaceable in the housing, an end face of the piston and an end face of the actuator base opposite the end face of the piston defining a variable-volume pressure chamber in the interior of the housing, the actuator base and the housing delimiting a fixed-volume dead space chamber on a side of the actuator base facing away from the piston, and the actuator base having at least one passage opening between the dead space chamber and the pressure chamber; and including a number of closure members which at least corresponds to the number of passage openings in the actuator base, each closure member being designed to be inserted into one of the passage openings and to seal said passage opening in a gas-tight manner. As already discussed above, all passage openings are sealed by the closure members if the dead volume of the pressure chamber is to be kept as small as possible, e.g. if the valve is intended for use as a shut-off valve. If, however, a larger dead volume is desired, the passage openings are left open and not sealed by the closure members, for example if the valve is to be used as a control valve.

Furthermore, the above-mentioned object is achieved by a method of manufacturing valves of two different valve types, which differ in their dead volumes and which each include a valve basic unit of identical construction. As already described above, the valve basic unit includes a pneumatic drive unit having a housing, an actuator base arranged within the housing, and a piston/spindle unit arranged within the housing, the piston/spindle unit including a piston displaceable in the housing, an end face of the piston and an end face of the actuator base opposite the end face of the piston defining a variable-volume pressure chamber in the interior of the housing, the actuator base and the housing delimiting a fixed-volume dead space chamber on a side of the actuator base facing away from the piston, and the actuator base having at least one passage opening between the dead space chamber and the pressure chamber. For valves of a first valve type, a closure member is inserted into one passage opening or, in the case of a plurality of passage openings, into each of the passage openings of the actuator base, so that the respective passage opening is permanently sealed in a gas-tight manner and the dead space chamber is permanently fluidically uncoupled from the pressure chamber, whereas for valves of a second valve type, the at least one passage opening remains unsealed, so that the dead space chamber is in permanent fluid communication with the pressure chamber via the at least one passage opening.

In this way, during assembly of the valve, the dead space chamber is fluidically isolated from the pressure chamber or it remains fluidically connected to the pressure chamber by sealing the passage openings or, respectively, by leaving them open. The valve type and thus the intended use of the valve can thus be defined with the single method step of inserting the closure members into the passage opening(s) or refraining from inserting the closure members into the passage opening(s).

Two different valve types can thus be manufactured quickly and easily with identical valve basic units.

In a valve of the first valve type, at least one closure member is inserted in each of the passage openings, which permanently seals the passage opening in a gas-tight manner, so that the dead space chamber is permanently fluidically uncoupled from the pressure chamber.

Such a valve can be a shut-off valve. The small dead volume provides for high dynamics and short switching times when the valve is opened, i.e. when the valve element is lifted off the valve seat. In addition, the small dead volume allows the control air consumption to be reduced during switching of the valve.

In a valve of the second valve type, the at least one passage opening is left open and the dead space chamber is in permanent fluid communication with the pressure chamber via the at least one passage opening.

Such a valve can be a control valve. The large dead space volume results in good linearity between different lifting positions of the piston and thus of the valve element for controlling the media flow.

DETAILED DESCRIPTION

For reasons of clarity, not all of the identical components are always provided with reference numbers.

Figure 1:
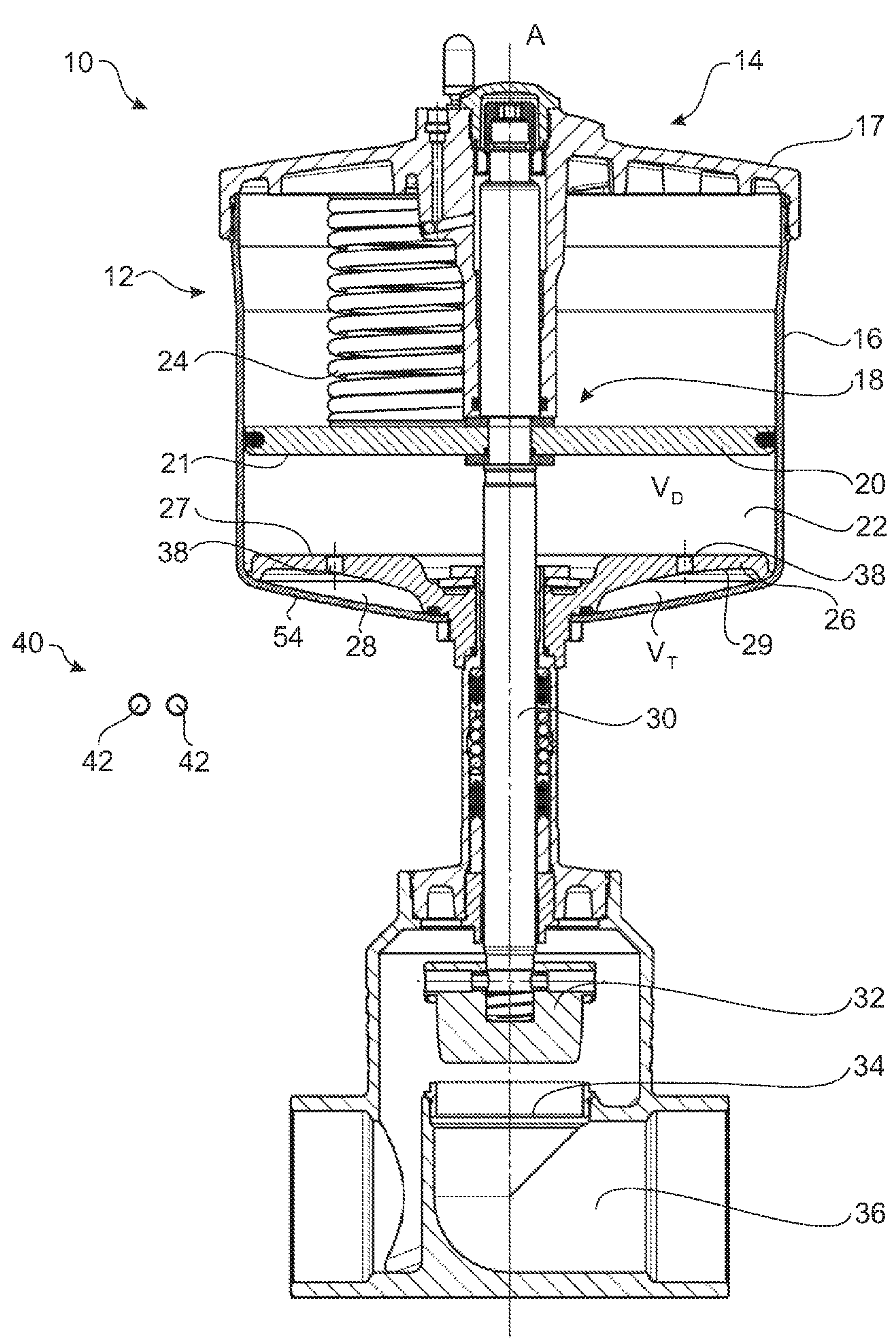
FIG. 1 shows a schematic sectional view of a valve according to the disclosure, manufactured in accordance with a method according to the disclosure using a modular system according to the disclosure, according to a first valve type.

FIG. 1 shows a valve 10 in the form of a pneumatic process valve. Process valves control the flow of fluids through systems and pipes.

The valve 10 comprises a valve basic unit 12 having a pneumatic drive unit 14. The pneumatic drive unit 14 includes a pot-shaped housing 16, which is closed on one side by a cover 17, and a piston/spindle unit 18, which is accommodated in the housing 16.

A piston 20 of the piston/spindle unit 18 is displaceably arranged in a cylindrical section of the housing 16. The piston 20 is in sealing contact at its edge with the inside of the housing 16 and defines, by one of its end faces 21, a pressure chamber 22 having a variable volume $V_D$.

The pressure chamber 22 is connected to an inlet and an outlet for compressed air (not shown). When compressed air is admitted into the pressure chamber 22, the piston 20 is moved against the force of a spring 24 acting as a return element, and the volume $V_D$ of the pressure chamber 22 increases.

When the compressed air is released from the pressure chamber 22, the spring force of the spring 24 shifts the piston 20 along the axial direction A as far as an actuator base 26, the end face 27 of which is opposite the end face 21 of the piston 20 and is also part of the boundary of the pressure chamber 22. In the process, the volume $V_D$ of the pressure chamber 22 is reduced down to a dead volume, in which the compressed air from the pressure chamber 22 cannot be displaced by the piston 20 (see FIG. 3).

The actuator base 26 is a part that is separate from the housing 16 and inserted into the housing.

The volume $V_D$ of the pressure chamber 22 is therefore smallest here when the valve 10 is in its fully closed position and largest when the valve 10 is in its fully open position, which is shown in FIG. 1.

The actuator base 26 is arranged on a side of the housing 16 opposite the cover 17, and the end face 27 is substantially parallel to the end face 21 of the piston 20.

On the side 29 of the actuator base 26 facing away from the piston 20, a dead space chamber 28 having a fixed volume $V_T$ is formed between the actuator base 26 and an inner surface of the housing 16. The actuator base 26 is mounted in the housing 16 so as to be fixed and immovable. Therefore, the volume $V_T$ of the dead space chamber 28 will not change when the piston 20 moves in the housing 16.

Both the end face 21 of the piston 20 and the end face 27 of the actuator base 26 are oriented perpendicular to the axial direction A of the valve 10.

The actuator base 26 separates the pressure chamber 22 from the dead space chamber 28.

A valve element 32 which cooperates with a valve seat 34 is located at an end of the spindle 30 of the piston/spindle unit 18 directed away from the pneumatic drive unit 14. Driven by the pneumatic drive unit 14, the valve element 32 is lifted off the valve seat 34 or comes to rest against it as a result of the lift of the piston 20 and the associated linear movement of the spindle 30 along an axial direction A of the valve 10. This lifting movement of the valve element 32 controls a media flow through the valve seat 34 in a flow channel 36.

Figure 4:
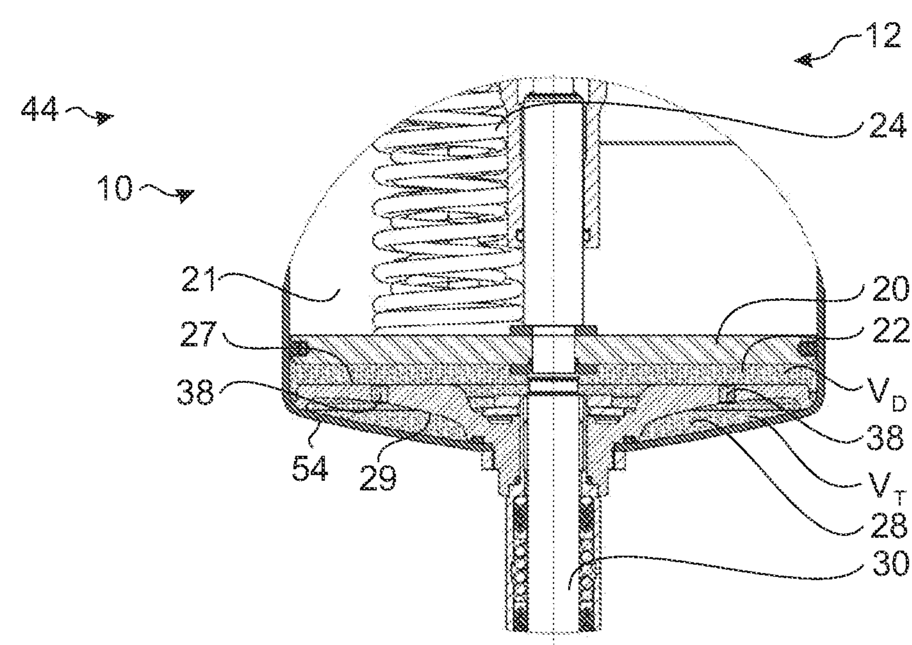
FIG. 4 shows the valve from FIG. 2 in a closed state.
Figure 5:
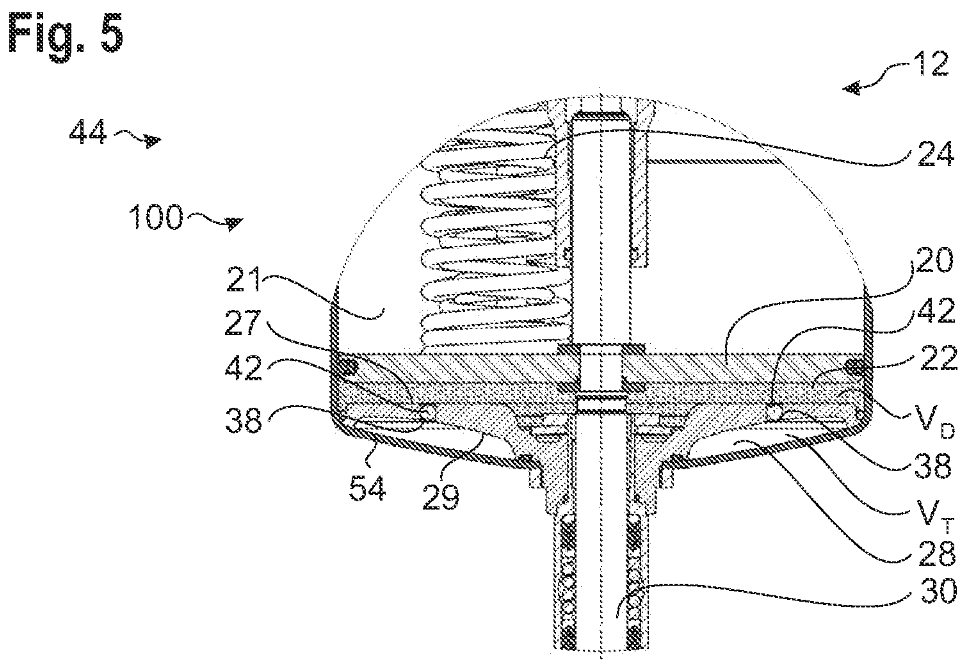
FIG. 5 shows the valve from FIG. 3 in a closed state.

Depending on the degree of elasticity of the valve element 32 and/or the valve seat 34, the piston 20 remains slightly spaced away from the end face 27 in its lowest position, as shown in FIGS. 4 and 5, so as not to provoke a double fit.

The flow channel 36 is completely separate fluidically from the pneumatic drive unit 14, the pressure chamber 22 and the dead space chamber 28.

In the example illustrated here, the valve 10 is constructed as a normally closed valve, i.e. the valve element 32 rests against the valve seat 34 when the volume $V_D$ of the pressure chamber 22 is at a minimum. An implementation for a normally open valve is also possible, in which case the valve element 32 is arranged such that it is lifted off the valve seat 34 when the volume $V_D$ of the pressure chamber 22 is at a minimum.

The actuator base 26 is provided with one or more passage openings 38 that extend from the end face 27 as far as to the opposite side 29 of the actuator base 26.

In addition to the valve 10, an assembly 40 comprises a number of closure members 42, the number of closure members 42 at least corresponding to the number of passage openings 38 in the actuator base 26.

The closure members 42 are matched to the passage openings 38 such that they can close them in a gas-tight manner when they are inserted into the passage openings 38.

When the passage openings 38 are left open, they constitute the only fluid communication between the pressure chamber 22 and the dead space chamber 28. In this case, the dead volume of the pressure chamber 22 comprises both the dead volume that exists between the piston 20 and the actuator base 26 as a residual volume when the valve 10 is closed or the pressure chamber 22 is empty, and additionally the volume $V_T$ of the dead space chamber 28 (see FIG. 4). Strictly speaking, the volume of the passage openings 38 also belongs to this, but it is so small that it is negligible for all practical purposes and is therefore not considered here.

When, in contrast, the passage openings 38 are all sealed in a gas-tight manner with a respective closure member 42, the dead space chamber 28 is fluidically isolated from the pressure chamber 22, i.e. there is then no fluid communication between the dead space chamber 28 and the pressure chamber 22, and the volume $V_T$ of the dead space chamber 28 is permanently uncoupled from the pressure chamber 22. In this case, the dead volume of the pressure chamber 22 is limited to the dead volume between the piston 20 and the actuator base 26, and the volume $V_T$ of the dead space chamber 28 does not contribute to the dead volume of the pressure chamber 22 (see FIG. 5).

In this way, a modular system 44 is formed (see FIGS. 2 to 5), which comprises the valve basic unit 12 and the number of closure members 42 required in each case, and which can be used to manufacture two different valve types.

Figure 3:
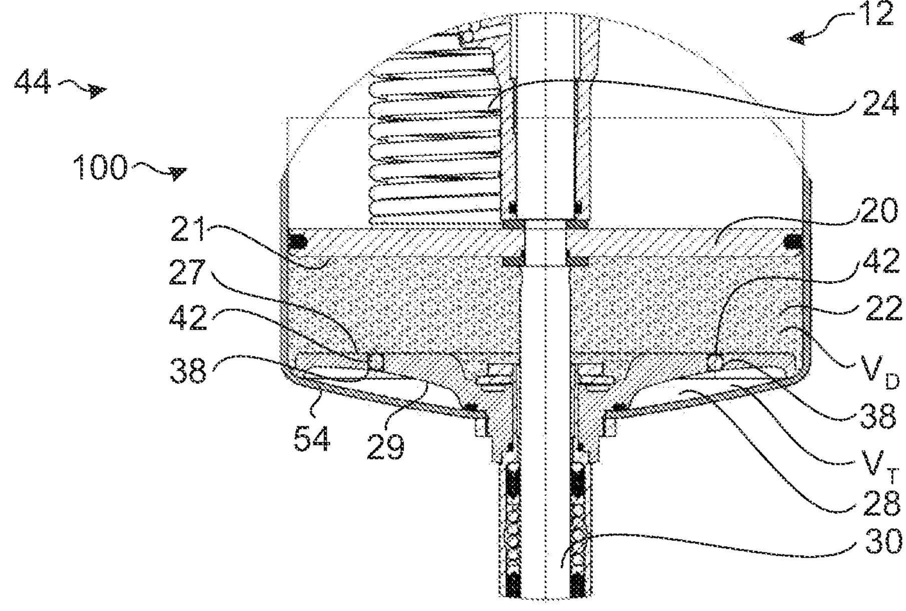
FIG. 3 shows an enlarged detail view of the valve from FIG. 1 with closure members inserted to provide a second valve type, in an open state of the valve.

To manufacture the two different valve types, the passage openings 38 are either permanently left open, which results in the valve 10 of a first valve type, or the closure members 42 are permanently inserted in the passage openings 38, which results in a valve 100 of a second valve type (see FIGS. 3 and 5).

In both valve types, the dead volume of the pressure chamber 22 will not change after completion.

Figure 2:
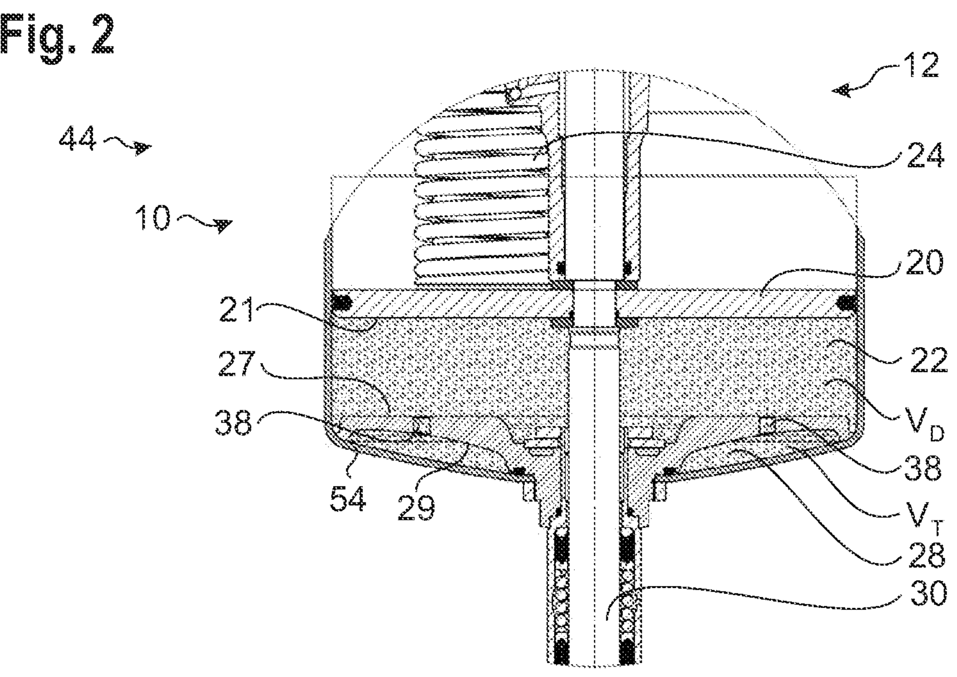
FIG. 2 shows an enlarged detail view of the valve from FIG. 1 in an open state of the valve.

The valve 10 of the first valve type, which is illustrated in FIGS. 1, 2 and 4, is employed as a control valve here. The valve 100 of the second valve type, which is shown in FIG. 3, is used as a shut-off valve here.

Insertion of the closure members 42 into the passage openings 38 is performed during assembly of the valve 100, for example before the actuator base 26 is inserted into the housing 16.

The closure members 42 may be fixed in the passage openings 38 in a gas-tight manner in any suitable way. For example, it is possible to simply press the closure members 42 into place, but they may alternatively or additionally be glued, welded, screwed, riveted or soldered in place.

In this example, the diameter of the passage openings 38 and the size of the closure members 42 are adapted to each other such that the closure members 42 when inserted do not protrude beyond the end face 27 of the actuator base 26 (see FIGS. 3 and 5).

Optionally, the passage openings 38 may have a suitable shoulder or step on their inner surface in order to precisely predefine the position of the closure member 42 inside the respective passage opening 38 (not shown).

In the example shown here, the closure members 42 are stainless steel balls that have a slightly larger diameter than the passage openings 38, so that they seal the passage openings 38 in a gas-tight manner when they are pressed in.

All of the passage openings 38 have the same diameter here, so that identical closure members 42 can be inserted into all passage openings and only one type of closure member 42 is required.

Figures 6, 7:
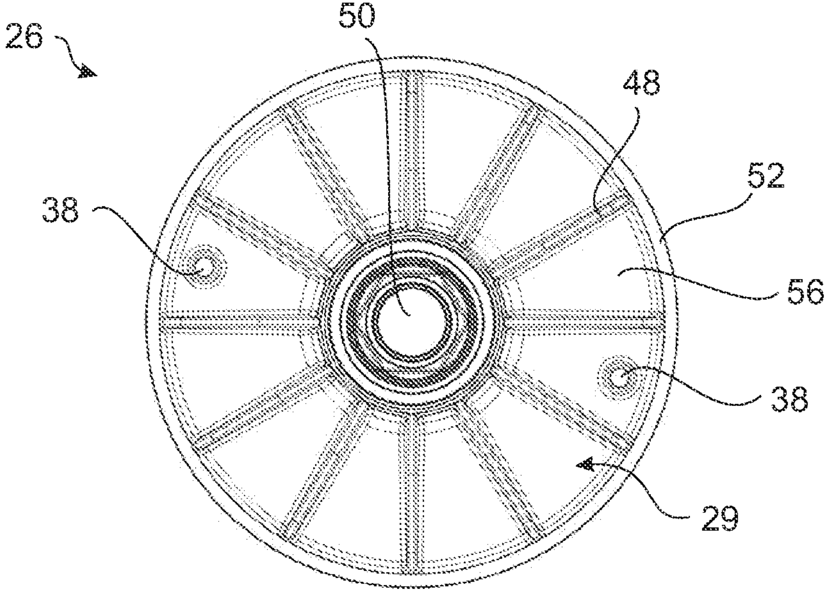
FIGS. 6 and 7 show schematic views of an actuator base of the valve according to both valve types.

FIGS. 6 and 7 illustrate one possible embodiment of the actuator base 26. On its side 29 facing away from the piston 20, the actuator base 26 includes a multitude of radially extending stabilizing ribs 48. The stabilizing ribs 48 here extend from a circumferential wall of a central opening 50 in the actuator base 26, through which the spindle 30 extends, to a circumferential edge 52 and, in this example, rest against the bottom 54 of the housing 16 at their axial ends.

Along its circumferential edge 52, the actuator base 26 is connected to the housing 16 in a gas-tight manner, for example by welding, gluing and/or a seal. The passage of the spindle 30 through the opening 50 is also sealed.

In the embodiment described above, all of the intermediate spaces 56 are in fluid communication with each other radially between the stabilizing ribs 48, so that a single dead space chamber 28 that comprises all of the intermediate spaces 56 is formed below the actuator base 26.

In a possible alternative embodiment, at least some of the stabilizing ribs 48 are configured such that a plurality of dead space chambers are produced in the intermediate spaces 56, the dead space chambers being separate from each other in a gas-tight manner and each being connected to the pressure chamber 22 by means of its own passage openings. In this case, a separate decision is made for each of the dead space chambers during assembly of the valve 100 as to whether the respective passage opening is to be closed by closure members or is to remain open, in order to determine the total dead volume of the pressure chamber 22 as a function of the number of dead space chambers that are in fluid communication.

The invention claimed is:

1. A modular system for manufacture of valves of different types, comprising the following components:

a valve basic unit which comprises a pneumatic drive unit having a housing, an actuator base arranged within the housing, and a piston/spindle unit arranged within the housing, the piston/spindle unit including a piston displaceable in the housing, an end face of the piston and an end face of the actuator base opposite the end face of the piston defining a variable-volume pressure chamber in an interior of the housing, the actuator base and the housing delimiting a fixed-volume dead space chamber on a side of the actuator base facing away from the piston, and the actuator base having at least one passage opening between the dead space chamber and the pressure chamber; and a number of closure members which at least corresponds to the number of passage openings in the actuator base, the closure members being designed to be each inserted into one of the passage openings and to seal said passage opening in a gas-tight manner in order to fluidically selectively permanently disconnect the dead space chamber from the pressure chamber.

2. The modular system according to claim 1, wherein the closure member is a ball having a larger diameter than the passage opening.

3. The modular system according to claim 1, wherein on a side facing away from the pressure chamber, the actuator base is provided with stabilizing ribs.

4. The modular system according to claim 3, wherein the stabilizing ribs rest against the housing.

5. The modular system according to claim 1, wherein the actuator base is permanently sealed in a gas-tight manner from an inner surface of the housing at a circumferential edge.

6. An assembly made up of a valve basic unit which comprises a pneumatic drive unit having a housing, an actuator base arranged within the housing, and a piston/spindle unit arranged within the housing, the piston/spindle unit including a piston displaceable in the housing, an end face of the piston and an end face of the actuator base opposite the end face of the piston defining a variable-volume ($V_D$) pressure chamber in an interior of the housing, the actuator base and the housing delimiting a fixed-volume dead space chamber on a side of the actuator base facing away from the piston, and the actuator base having at least one passage opening between the dead space chamber and the pressure chamber; and a number of closure members which at least corresponds to the number of passage openings in the actuator base, each closure member being designed to be inserted into one of the passage openings and to seal said passage opening in a gas-tight manner.

7. A method of manufacturing valves of two different valve types which differ in their dead volumes and which each include a valve basic unit of identical construction, which comprises a pneumatic drive unit having a housing, an actuator base arranged within the housing, and a piston/spindle unit arranged within the housing, the piston/spindle unit including a piston displaceable in the housing, an end face of the piston and an end face of the actuator base opposite the end face of the piston defining a variable-volume pressure chamber in an interior of the housing, the actuator base and the housing delimiting a fixed-volume dead space chamber on a side of the actuator base facing away from the piston, and the actuator base having at least one passage opening between the dead space chamber and the pressure chamber; and wherein (a) in valves of a first valve type, a closure member is inserted into one passage opening or, in case of a plurality of passage openings, into each of the passage openings of the actuator base, so that the respective passage opening is permanently sealed in a gas-tight manner and the dead space chamber is permanently fluidically uncoupled from the pressure chamber, and (b) in valves of a second valve type, the at least one passage opening remains unsealed, so that the dead space chamber is in permanent fluid communication with the pressure chamber via the at least one passage opening.

8. A valve, manufactured as a valve of the first valve type in accordance with the method according to claim 7, wherein a closure member is inserted in each passage opening, which permanently seals the passage opening in a gas-tight manner, so that the dead space chamber is permanently fluidically uncoupled from the pressure chamber.

9. The valve according to claim 8, wherein the valve is a shut-off valve.

10. A valve, manufactured as a valve of the second valve type in accordance with the method according to claim 7, wherein the at least one passage opening is left open and the dead space chamber is in permanent fluid communication with the pressure chamber via the at least one passage opening.

11. The valve according to claim 10, wherein the valve is a control valve.

* * * * *